United States Patent
Aho et al.

(10) Patent No.: US 7,401,219 B2
(45) Date of Patent: Jul. 15, 2008

(54) METHOD AND APPARATUS FOR PROTECTING EXTERNAL CALL REFERENCES

(75) Inventors: Michael Edward Aho, Rochester, MN (US); Joseph Patrick Reynolds, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 831 days.

(21) Appl. No.: 10/341,981

(22) Filed: Jan. 14, 2003

(65) Prior Publication Data

US 2004/0139342 A1   Jul. 15, 2004

(51) Int. Cl.
*H04L 9/00* (2006.01)
*G06F 15/16* (2006.01)
*G06F 9/44* (2006.01)
*G06F 3/00* (2006.01)

(52) U.S. Cl. .................. 713/165; 713/167; 713/189; 726/2; 726/3; 726/5; 717/162; 717/163; 717/164; 719/330; 719/331; 719/332

(58) Field of Classification Search ................ 713/165, 713/167, 187, 190, 191, 194, 189; 726/2–3, 726/5, 10, 14; 717/162–164; 719/330–332
See application file for complete search history.

(56) References Cited

U.S. PATENT DOCUMENTS

| | | | | |
|---|---|---|---|---|
| 5,797,014 A * | 8/1998 | Gheith | ....................... | 717/163 |
| 5,822,787 A * | 10/1998 | Zucker | ....................... | 711/213 |
| 5,892,904 A * | 4/1999 | Atkinson et al. | ............... | 726/22 |
| 5,970,252 A * | 10/1999 | Buxton et al. | ................ | 717/166 |
| 5,978,484 A * | 11/1999 | Apperson et al. | ............. | 705/54 |
| 5,987,123 A | 11/1999 | Scott et al. | | |
| 6,212,578 B1 * | 4/2001 | Racicot et al. | ............... | 719/330 |
| 6,363,436 B1 * | 3/2002 | Hagy et al. | .................. | 719/331 |
| 6,367,012 B1 * | 4/2002 | Atkinson et al. | ............ | 713/176 |
| 6,546,433 B1 * | 4/2003 | Matheson | .................... | 719/318 |
| 6,564,223 B1 * | 5/2003 | Sexton et al. | ............. | 707/103 Y |
| 7,062,650 B2 * | 6/2006 | Robbins et al. | .............. | 713/167 |

OTHER PUBLICATIONS

U.S. Appl. No. 09/957,421 "Method and Apparatus for Protecting Ongoing System Integrity of a Software Product Using Digital Signatures", Michael E. Aho, et al., filed Sep. 20, 2001.

* cited by examiner

*Primary Examiner*—Minh Dieu Nguyen
(74) *Attorney, Agent, or Firm*—Grant A. Johnson (57) ABSTRACT

The present invention is generally directed to a method, system, and article of manufacture that ensures the integrity of programs having variable portions. One aspect of this invention is a method for protecting software products having variant portions. This method includes identifying a reference to an external target in a software product, creating an identifier for the external target, and adding the identifier to the reference. In some embodiments, the unique identifier is a digital signature and the reference to an external target is a call to an external library.

9 Claims, 6 Drawing Sheets

METHOD AND APPARATUS FOR PROTECTING EXTERNAL CALL REFERENCES

FIELD OF THE INVENTION

The present invention generally relates to software distribution methods and systems, and more particularly, to a method, apparatus, and system for protecting software products containing references to external functions.

BACKGROUND

The development of the EDVAC computer system of 1948 is often cited as the beginning of the computer era. Since that time, computer systems have evolved into extremely complicated devices. To be sure, today's computers are more sophisticated than early systems such as the EDVAC. Fundamentally speaking, though, the most basic requirements levied upon computer systems have not changed. Now, as in the past, a computer system's job is to access, manipulate, and store information. This fact is true regardless of the type or vintage of computer system.

Computers access, manipulate, and store information by following a detailed set of instructions ("program" or "software") that are generally organized into a number of discrete parts ("functions," "components" or "modules"). Software developers have organized some of the most commonly used functions into "libraries," which the software developer can "call" when the program under development needs to use those functions. In this way, the software developers can use the functions in the library without having to rewrite the supporting code each time.

Traditionally, computer programs were distributed from the software developer to the end user on physical storage media, such as a floppy disk or a CD-ROM. Unfortunately, this method of distribution was both slow and costly. To overcome this limitation, many software developers have begun to replace the physical medial with transmission media, such as the Internet. Although this change allows end users to easily and cheaply "download" new software from the developer, the end user has no way of knowing whether the party supplying the software is trustworthy. That is, due to the public nature of the Internet, the end user cannot ensure that the digital location from which they download the software is controlled by the software developer and that the software they received was not altered during transit. Software supplied from untrusted sources can contain unexpected "bugs" and/or may contain a computer "virus" that can destroy data on the end user's computer system.

This problem is compounded by the fact that many programs require changes ("updates," "upgrades," or "fixes") after the initial distribution to correct the bugs in the program and to add new functionality. As a result, computer owners also need to ensure the ongoing integrity of the software on their systems. Ongoing system integrity imposes requirements on the security system beyond those required to ensure transport integrity. More specifically, any system used to ensure ongoing system integrity of a software product must accommodate the addition of new components to an existing software installation, the replacement of existing software components with new components, and the deletion of old components.

Conventional systems typically use digital signatures to ensure software integrity. A digital signature is an electronic code that uniquely identifies the signer of a digital object (e.g., a file). There are a number of different encryption techniques that provide these features. One such technique is to first use a special function to compute a value ("hash") on the software object in such a way that it is extremely unlikely that some other object will produce the same value, and then use public-key encryption techniques to encrypt the hash. The end user can verify both the signed object and the sender's identity by first re-computing the hash of the object, then decoding to the original hash, and finally comparing the recomputed hash with the decoded hash. Additional information about public key cryptography and digital signatures can be found in Bruce Schneir, *Applied Cryptography, Second Edition: Protocols, Algorithms, and Source Code in C*, (John Wiley & Sons 1996), which is herein incorporated by reference in its entirety.

One problem with conventional techniques, however, is that they could not protect variant portions of the programs, such as references to an external library. For example, a program dependent on a relocateable library needs to resolve the location to call entries within the external libraries. This linkage is resolved using the explicit program signature (e.g., in C++, the so-called "mangled name" that uniquely names the procedure or method and includes the description of the call parameters in the mangled name. In other languages, this may just be a uniquely resolvable name that may include none, part, or all of the parameters involved). The resolution of the external reference, sometimes referred to as the "binding," is left unprotected by conventional systems because the actual code that calls into the external can vary. This is, because the binding is merely a pointer to an external library whose location in memory is not dependably known, the value of the pointer can vary. Because the value of the pointer can vary, including the binding in the hashed code will cause the hash function to compute a different value.

Accordingly there is a need for a method and system that can ensure the integrity of the variant portions of programs.

SUMMARY

The present invention is generally directed to a method, system, and article of manufacture that ensures the integrity of programs having variable portions. The present invention takes advantage of the fact that although the location of the called function is unknown, two ends of the binding are definitive. Because this information is invariant, the invention incorporates its digital signature into the function call convention. To protect this information, in some embodiments, the program signature is inserted into the hash computation just prior to the code bytes starting the code invocation. The calling code is also signed in some embodiments, thus protecting both the program signature and its associated invocation location.

Accordingly, one aspect of the present invention is a method and computer program product for protecting software having references to external targets comprising identifying a reference to an external target in a software product, creating an identifier for the external target, and adding the identifier to the software product. In some embodiments, the identifier is a digital signature and the reference to an external target is a call to an external library.

Another aspect of the present invention is a method for protecting a program having a remote function call, wherein the remote function call comprises call convention to target function. One embodiment of this method comprises identifying a remote function call, identifying a target function of the remote function call, computing a hash of the target function, encrypting the hash of the target function using a private key associated with a recognized source of the software product, and adding the encrypted hash to the remote function call.

Still another aspect of the present invention is a method for protecting a program having an external library reference, wherein the external library reference comprises a digital signature of the external library. One embodiment of this method comprises extracting a digital signature from the external library reference, wherein the digital signature comprises an encrypted hash computed by a recognized source of the program, extracting the encrypted hash result from the digital certificate, decoding the encrypted hash result, computing a hash of the external library, and comparing the hash of the external library to the decoded hash. In some embodiments, the external library reference further comprises a public encryption key associated with the recognized source, a digital certificate that identifies the recognized source, and a path of the external library.

The present invention offers numerous advantages over the conventional implementations. For example, checking the digital signature at bind time removes the onus of the called program of having to do the checking and having to incur the resulting overhead at runtime. This and other features, aspects, and advantages will become better understood with reference to the following description, appended claims, and accompanying drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
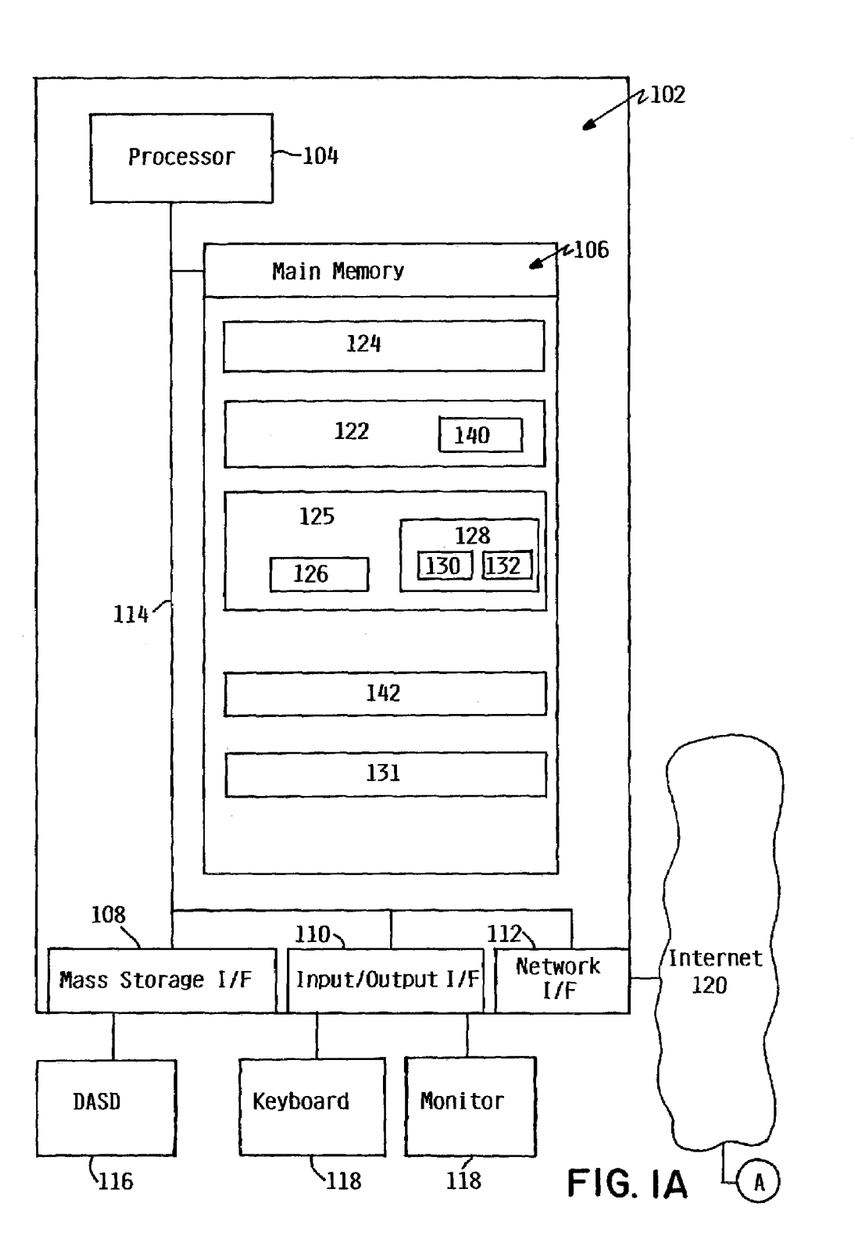
FIGS. 1A-1B depict a computer embodiment suitable for use by the software developer, and a computer embodiment suitable for use by the end user of the software product.
Figure 1B:
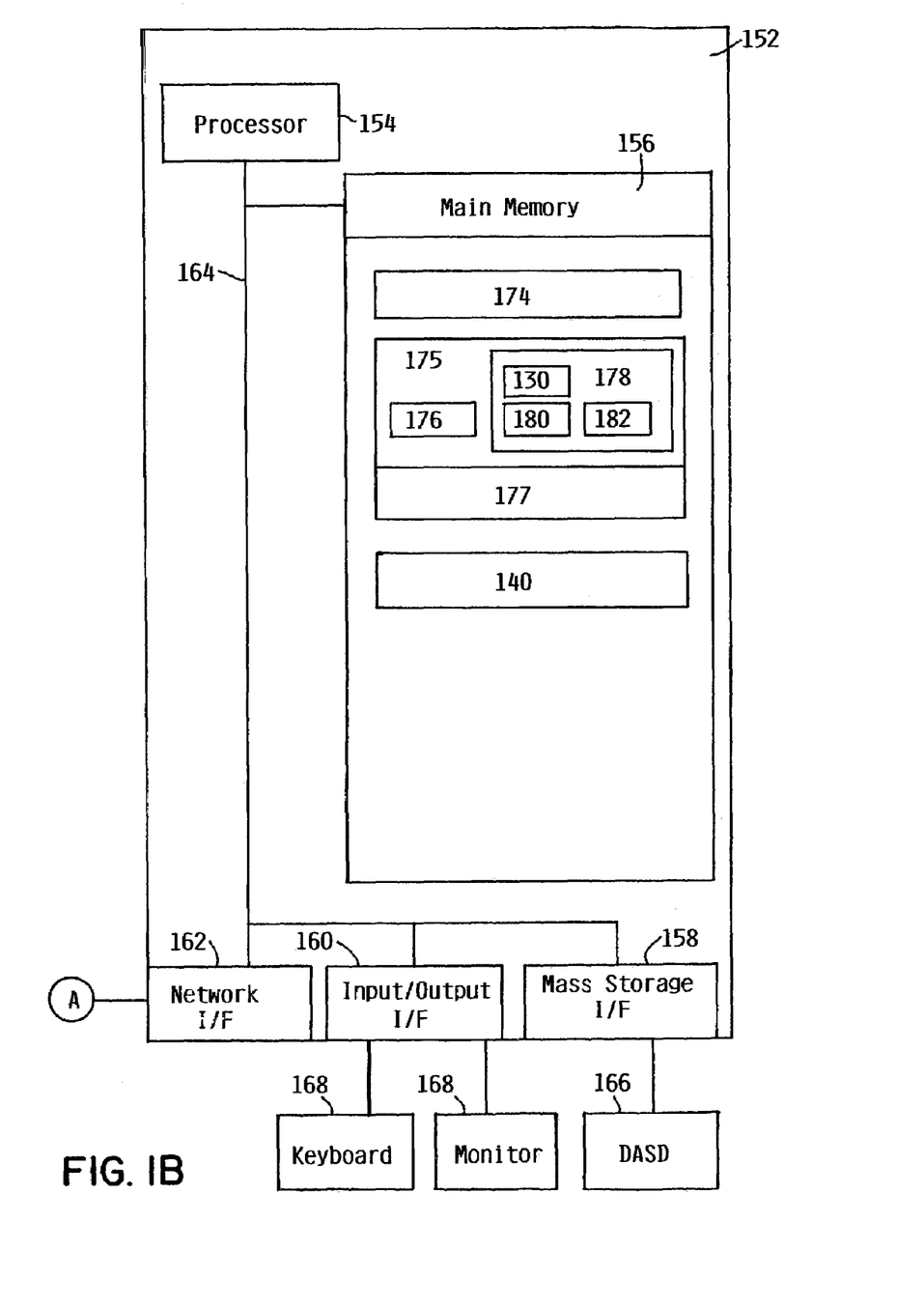

FIGS. 1A-1B depict one embodiment of an external call reference protection system 100. This embodiment comprises a first computer 102 for use by the developer of a software product 122 and a second computer 152 for use by the end user of the software product 122. The developer's computer 102 and the user's computer 152 both have a processor 104, 154 connected to a main memory 106, 156; a mass storage interface 108, 158; an input/output ("I/O") interface 110, 160; and a network interface 112, 162 via a system bus 114, 164. The mass storage interfaces 108, 158 located in the two computers connect one or more direct access storage devices ("DASD") 116, 166, such as a hard disk drive, to the respective system buses 114, 164. The I/O interfaces 110, 160 connect one or more input/output devices 118, 168, such as a keyboard or monitor, to the system bus 114, 164. The network interfaces 112, 162 connect the developer's computer 102 to the end user's computer 152 over an appropriate communication medium, such as the Internet 120.

The memory 106 and/or DASD 116 in the developer's computer 102 contain an operating system 124, a software protection program 125, and a complier program 131. The software protection program 125 in this embodiment comprises a hash routine 126 and a public key encryption 128 with an associated public 130 and a private 132 encryption key pair. The program to be distributed 122 includes a calling function 140 and is linked to an external library 142 (e.g., a statically or dynamically linkable function library, or other shared object). The memory 156 and/or DASD 166 in the end user's computer 152 contain an operating system 174 and a software protection program 175. The software protection program 175 comprises a hash routine 176, a link-loader 177, and a public key encryption program 178 containing the developer's public key 130 and a key generation routine (not shown) capable of generating an associated public 180 and private 182 encryption key pair.

Figure 2:
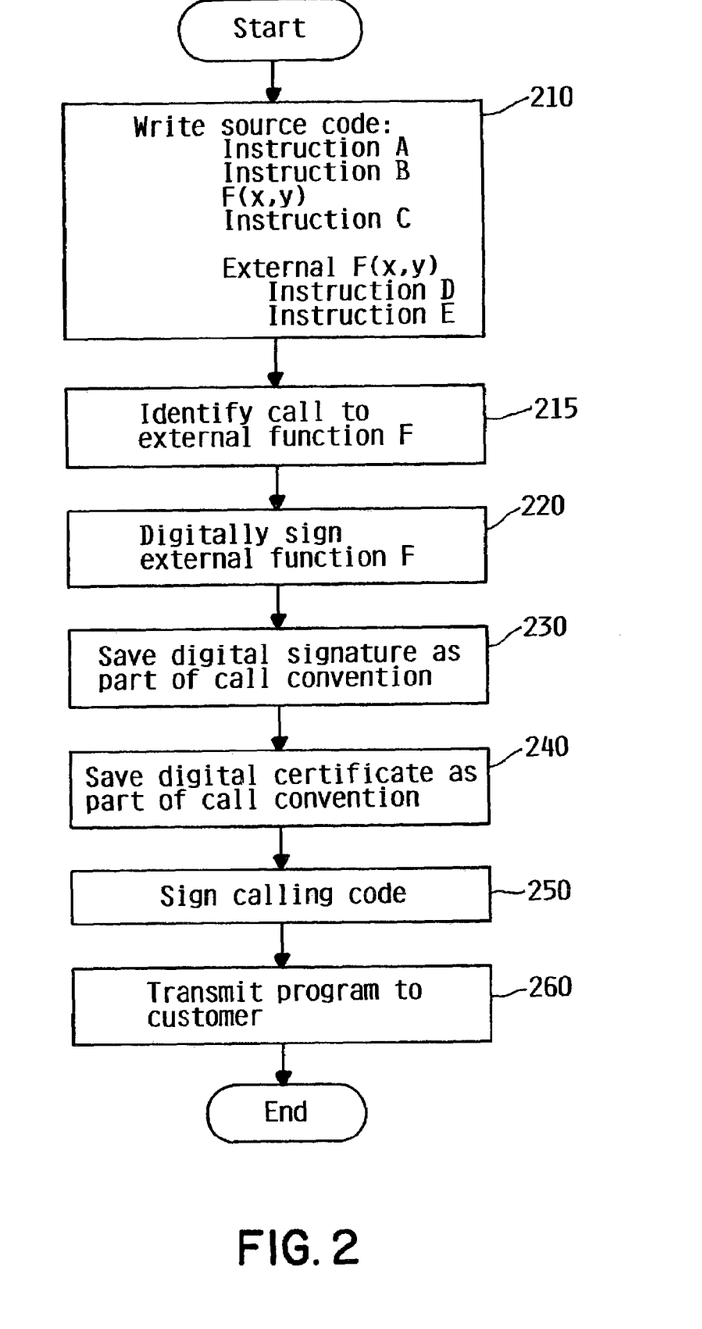
FIG. 2 illustrates one embodiment the software protection program in operation on the developer's computer.
Figure 3:
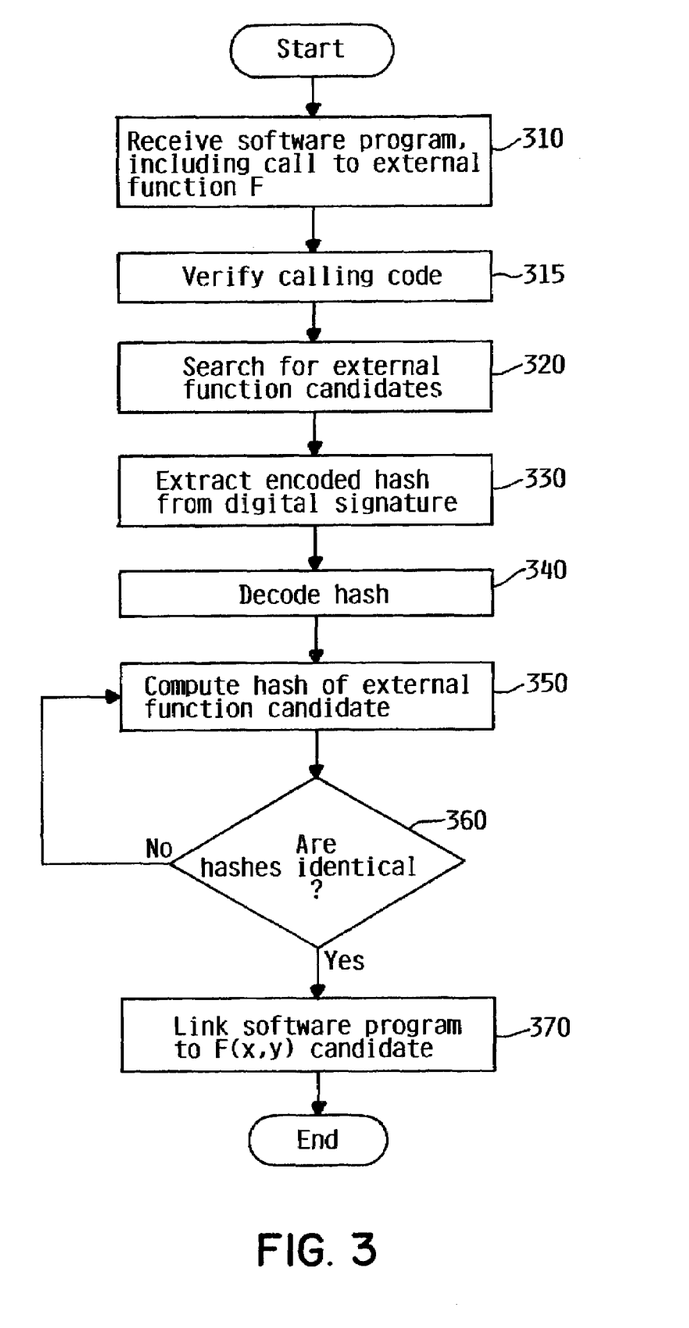
FIG. 3 illustrates one embodiment of the software protection program in operation on the end user's computer.

FIGS. 2-3 illustrates one embodiment of the present invention in operation. At block 210, the software developer writes the source code for the calling function 140. This source code contains one or more instructions for the computer to use the functionality in the external library 142. Thus, as illustrated in FIG. 2., the software developer intends the computer to perform the instructions in the following order: instruction A, then instruction B, then instruction D, then instruction E, then instruction C. At block 215, the software developer begins to convert the source code for the calling function 140 and the external library 142, if necessary, into machine-readable "object" form using the compiler 131. Part of this process includes the identification of calls to external functions and the creation of a call convention from calling code (i.e., instruction F(x,y)) to the instructions in the external library (i.e., instructions D and E). Part of this call convention, in turn, comprises a "pointer" from the location of instruction B in the computer's memory to the location of instruction D in the computer's memory.

At block 220, the software protection program 125 digitally signs the external library 142. This digital signature comprises a hash of the external library 142 that has been encrypted using the developer's private encryption key 132. At block 230, the software protection program 125 saves the digital signature for the external library 142 as part of the call convention. That is, the call convention for the external library 142 will include information that identifies the external library 142 as being the particular instance of the library provided by the developer. Accordingly, the software protection program 175 on the end user's computer 152 can use the call convention of the present invention and its digital signature to ensure that the call to external library 142 resolves to the correct instance of that function and that that selected instance of the external library 142 has not been modified, either in transit or while on the user's computer.

Next, at block 240, the software protection program 125 saves a digital certificate with the digital signature. This digital certificate includes the developer's public key 130 and information that ensures that the public key 130 belongs to the developer. At blocks 250-260, the software developer digitally signs the calling code, including external function F's digital signature and the developer's digital certificate, using conventional techniques and then transmits the package to the end user's computer 152 over the Internet 120.

FIG. 3 illustrates one embodiment the software protection program 175 in operation. At block 310, the end user receives the software program 122, which includes a calling function 140 having least one call to the external library 142. The call convention for this call includes a digital signature for the external library 142 that was created by the software developer, and a digital certificate that certifies the identity of the developer. At block 315, the software protection program 175 verifies the calling code using the digital signature created at block 220. At block 320, the software protection program 175 searches the memory 156 and/or DASD 166 for a list of candidate targets for the external library 142. The list may be created in a variety of ways. For example, the list may be a very specific list of eligible objects and their location, or may created from a sequence of directories (commonly called a "search path") through which the link loader searches from first to last for the external library 142. Those skilled in the art will appreciate that the list may contain several instances of the external library 142.

At block 330, the software protection program 175 extracts the external library's encrypted hash value from the digital signature stored with the call convention (i.e., the hash computed at block 220). At block 340, the software protection program decodes the hash value using the developer's public key 130. At blocks 350-360, the software protection program 175 begins to search through the list of candidates for an instance of the external library 142 having a hash value the value decoded at block 240. As part of this process, the software protection program 175 uses its own hash routine 176 to compute a hash for each candidate target in the list and then compares it to the decoded hash. As soon as the software protection program 175 finds two identical values, it proceeds to link the corresponding instance of the external library 142 at block 370. In this way, the software protection program 175 insures that that instance of the external library 142 is identical to the instance signed by the developer. If the software protection program is unable to find two identical hashes, it alerts the user that either the calling function 140 or the external library 142 has been altered.

Figure 4:
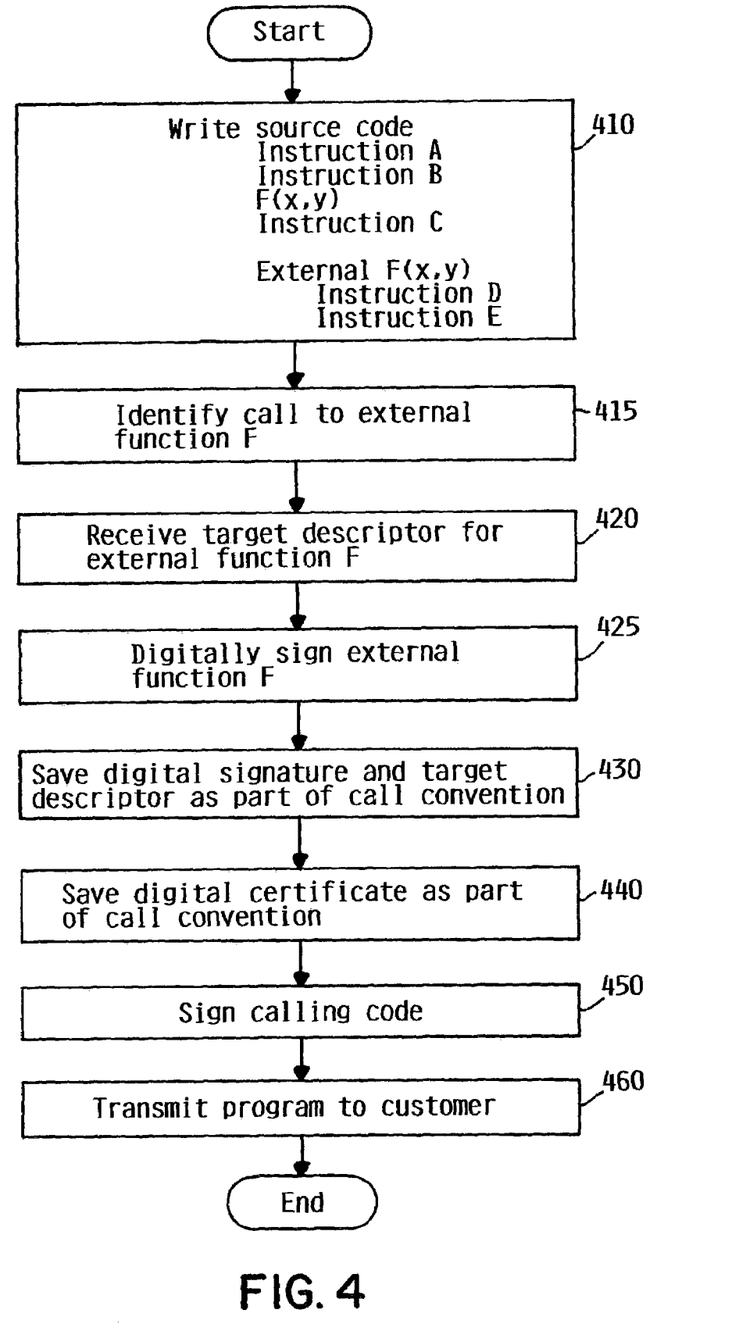
FIG. 4 illustrates a second embodiment the software protection program in operation on the developer's computer.
Figure 5:
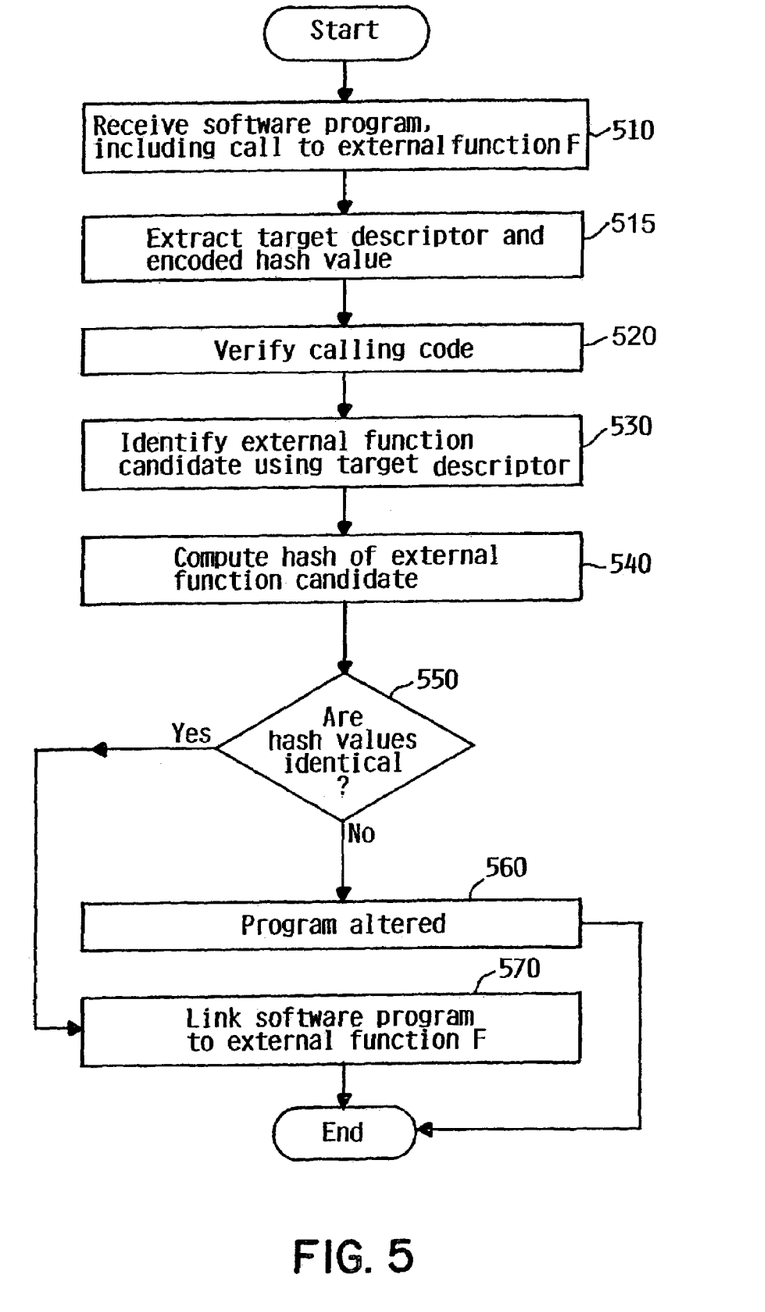
FIG. 5 illustrates a second embodiment of the software protection program in operation on the end user's computer.

FIGS. 4-5 depict a second embodiment of the present invention, which is particularly useful for use with highly integrated computer systems. At block 410, the software developer writes the source code for the calling function 140, which contains one or more references to the external library 142. At block 415, the software developer then begins to convert the source code into object form using the compiler program 131. Again, part of this process includes the identification of references to external functions 142 and the creation of a call convention to those functions. At block 420, the software protection program 125 queries the operating system 174 for a target descriptor of the external library 142. This target descriptor may be any information that identifies where a particular instance of the external library 142 is located in the memory 106 and/or DASD 116. Suitable target descriptors include, without limitation, the full path name of the target function, the mangled name of the function, and/or the function's date information (i.e., date of creation and last modification).

Next, at block 425, the software protection program 125 digitally signs the external library 142 using the developer's private encryption key 132. Next, at block 430, the software protection program 125 saves the digital signature and the target descriptor as part of the call convention for the external library 142. The software protection program 125 then saves a digital certificate with the call convention at block 440. Finally, at blocks 450-460, the software developer digitally signs the calling code, including external function F's digital signature, the target descriptor, and the developer's digital certificate, and then transmits the package to the end user's computer 152 over the Internet 120.

Referring now to FIG. 5, the end user receives the software program 122 at block 510. This program 122 contains a signed calling function 140 containing a call to an external function 142. The calling function also contains a digital signature, a target descriptor, and a digital certificate at each call site. At block 515, the software protection program 175 extracts the encrypted hash value and target descriptor for the external library 142 from the digital signature, then decodes that value using the developer's public key 130 to obtain the hash value computed by the software developer. At block 520, the software protection program 175 verifies the calling code using the digital signature created at block 420. At block 530-540, the software protection program 175 uses the target descriptor information to identify a particular instance of the external library 142 and hashes that instance using its own hash routine 176. Next, at block 540, the software protection program 175 compares two hash values. If the two values are identical, the software protection program 175 links together the calling function 140 and the external library 142 at block 570. If the values are not the same, the end user's computer alerts the user that the code has been altered at block 560.

Referring again to FIGS. 1A-1B, the processors 104, 154 in the computers 102, 152 may be constructed from one or more microprocessors and/or integrated circuits. The processors 104, 154 execute program instructions stored in the main memories 106, 156. The main memories 106, 156 store the programs and data that the processors 104, 154 may access. When the computers 102, 152 start up, the processors 104, 154 initially execute the program instructions that make up the operating systems 124, 174. The operating systems 124, 174 are sophisticated programs that manage the resources of computer systems 102, 152. Some of these resources are the processors 104, 154; the main memories 106, 156; the mass storage interfaces 108, 158; the I/O interfaces 110, 160; the network interfaces 112, 162; and the system buses 114, 164.

Although the computer systems 102, 152 are shown to contain only a single processor and a single system bus, those skilled in the art will appreciate that the present invention may be practiced using a computer system that has multiple processors and/or multiple buses. In addition, the interfaces that are used in this embodiment each include separate, fully programmed microprocessors that are used to off-load compute-intensive processing from the processors. However, those skilled in the art will appreciate that the present invention applies equally to computer systems that simply use I/O adapters to perform similar functions.

The computer systems 102, 152 in this embodiment utilize well known virtual addressing mechanisms that allow the programs of computer systems 102, 152 to behave as if they only have access to a large, single storage entity instead of access to multiple, smaller storage entities such as main memories 106, 156 and the DASD devices 116, 156. Therefore, while the operating system 124, 174, the protection software 125, 175, and their associated data, are shown to reside in main memory 106, 156, those skilled in the art will recognize that these items are not necessarily all completely contained in main memory 106, 156 at the same time, and may also reside in the virtual memory of other computer systems coupled to the computer system 102, 152.

The network interfaces 112, 162 are used to interconnect the computer systems 102, 152 across the Internet 120. However, the present invention applies equally no matter how the computers 102, 152 may be connected and regardless of whether the network connection is made using present-day analog and/or digital techniques or via some networking mechanism of the future. In addition, those skilled in the art will appreciate that many different network protocols can be used to implement the communication medium. TCP/IP (Transmission Control Protocol/Internet Protocol) is an example of a suitable network protocol for Internet communication.

One suitable computer 102, 152 is an eServer iSeries® computer running the OS/400® multitasking operating system, both of which are produced by International Business Machines Corporation of Armonk, N.Y. However, those skilled in the art will appreciate that the mechanisms and apparatus of the present invention apply equally to any computer system and operating system, regardless of whether the computer system is a complicated multi-user computing apparatus, a single workstation, or an embedded control system.

Although the present invention has been described in detail with reference to certain examples thereof, it may be also embodied in other specific forms without departing from the essential spirit or attributes thereof. For example, those skilled in the art will appreciate that the present invention is capable of being distributed as a program product in a variety of forms, and applies equally regardless of the particular type of signal bearing media used to actually carry out the distribution. Examples of suitable signal bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive, a CD-R disk, a CD-RW disk, or hard-disk drive); or (iii) information conveyed to a computer by a transmission medium, such as through a computer or telephone network, including wireless communications, and specifically includes information downloaded from the Internet and other networks. Such signal-bearing media, when carrying computer-readable instructions that direct the functions of the present invention, represent embodiments of the present invention.

In addition, although the present invention has been described with reference to embodiments that check the digital signatures at bind-time, the present invention also may be used to check digital signatures at run-time. These embodiments may be desirable because they can quickly detect unauthorized changes to the program 122. Furthermore, those skilled in the art will appreciate that the present invention could use any other information that uniquely defines the external library 142, such as program signatures, in place or in conjunction with the digital signatures and the target descriptor. Embodiments using program signatures may be particularly desirable for systems using interdependent binding techniques because they can resolve circular links.

Some embodiments of the present invention may also put additional requirements in place to ensure system integrity. For example, the software protection programs 175 in some embodiments could require that the same party digitally sign both the calling function 140 and external library 142 (i.e., using same private key 132). Other embodiments may allow different parties to sign the two components so long as both parties are "trusted parties." Another condition used in some embodiments is to add a callable entry or callable entries to a common table used by the binder and require enforcement that the program with the invocation locations—the entry or entries—be signed with a trusted digital signature.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Therefore, it is desired that the embodiments described herein be considered in all respects as illustrative, not restrictive, and that reference be made to the appended claims for determining the scope of the invention.

We claim:

1. A method for protecting a software program having an external library reference whereby call convention can be used to ensure call to the external library resolves to a correct instance of a function and that the selected instance has not been modified, the method comprising:
    receiving a digitally signed software program having a call to an external library, the call comprising an invariant target descriptor and a digital signature, wherein the digital signature comprises a hash of the external library encrypted by a recognized source of the software program;
    extracting the digital signature from the call;
    extracting the hash from the digital signature;
    using the invariant target descriptor to identify a first external library candidate;
    computing a hash of the first external library candidate; and
    comparing the extracted hash to the computed hash of the first external library candidate.

2. The method of claim 1, wherein invariant target descriptor comprises a path to the external library.

3. The method of claim 1, wherein the method is performed at bind-time.

4. The method of claim 1, wherein the method is performed at run-time.

5. The method of claim 1, further comprising, in response to the comparison, linking the first external library candidate software program.

6. The method of claim 1, further comprising, in response to the comparison, generating an alert that the first external library target has been altered.

7. The method of claim 1, wherein using the invariant target descriptor to identify a first external library candidate comprises searching a list of eligible objects and their location.

8. The method of claim 1, wherein using the invariant target descriptor to identify a first external library candidate comprises traversing a search path.

9. The method of claim 1, further comprising:
    using the invariant target descriptor to identify a second external library candidate;
    computing a hash of the second external library candidate; and
    comparing the extracted hash to the computed hash of the second external library candidate.

* * * * *